United States Patent Office 2,742,392
Patented Apr. 17, 1956

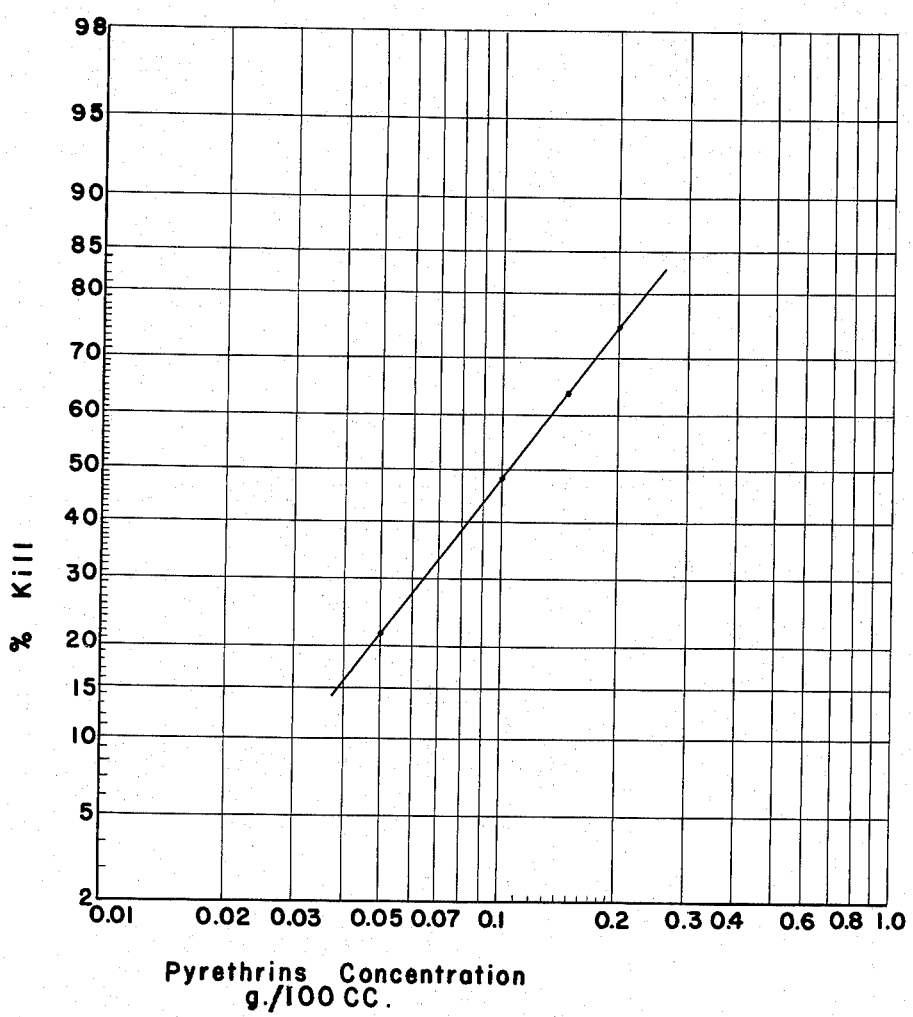

2,742,392

INSECTICIDAL COMPOSITIONS CONTAINING PYRETHRIN AND A CALCIUM PHTHALAMIDATE

Herschel G. Smith, Wallingford, Troy L. Cantrell, Drexel Hill, and Mark L. Hill, Boothwyn, Pa., assignors to Gulf Oil Corporation, Pittsburgh, Pa., a corporation of Pennsylvania Application October 2, 1952, Serial No. 312,845

3 Claims. (Cl. 167—24)

This invention relates to Insecticidal Compositions containing pyrethrin and a calcium phthalamidate, and more particularly to pyrethrin containing insecticidal compositions which are benefited by the inclusion therein of a novel class of additives.

It is, of course, quite desirable to increase the killing power of the toxicants used in insecticides. This is frequently accomplished by means of appropriate additives termed "synergists," which, when added to insecticide toxicants, result in compositions having a greater degree of toxicity than either the toxicant or the synergist alone, and additionally having a greater degree of toxicity than would be expected from a combination of the synergist with the toxicant at a given concentration. The phenomenon of synergism is well known in the art, and, although the exact mechanism responsible for the synergistic effects of many compounds is not fully known, the use of synergists is widely practiced.

Accordingly, this invention has as an object the provision of insecticidal compositions of enhanced killing power.

A further object is to provide compositions containing compounds capable of synergizing the killing properties of pyrethrin insecticidal toxicants.

These and other objects are accomplished by the present invention wherein we provide insecticidal compositions comprising a pyrethrin insecticide toxicant, a solvent therefor, and a substantially neutral calcium phthalamidate condensation product having the following formula:

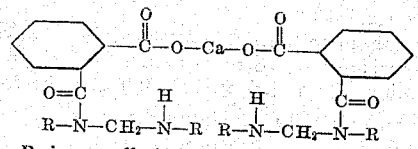

wherein R is an alkyl group containing from 8 to 20 carbon atoms.

Referring briefly to the attached drawing, there is shown the log-probability plot of per cent mortality for flies against various concentrations of pyrethrins.

The calcium phthalamidates employed in accordance with our invention can be readily prepared by "dimerizing" higher alkyl amines by means of formaldehyde to form methylene diamines and further reacting the methylene diamines with phthalic anhydride and lime.

The amines which are advantageously reacted with formaldehyde in accordance with our invention include those having the following generic formula:

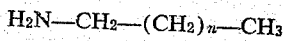

wherein $n$ is a number between 6 and 18. Primary alkyl amines of this generic class include capryl amine, decyl amine, lauryl amine, myristyl amine, cetyl amine, stearyl amine, eicosyl amine, and the like. Any one of the amines of the general formula can be used with advantage, although mixtures of such amines are preferred because of their commercial availability. For instance, one commercially available mixture of such amines is the so-called "cocoamine" prepared by converting the mixed acids of coconut oil into the corresponding amines by well known methods. The commercial cocoamine has an average molecular weight of about 200–210 and contains predominantly lauryl amine together with minor proportions of the homologues thereof. By "coco radical" as used herein is meant the mixture of coconut oil fatty acid alkyl groups present as N-substituents in commercial cocoamine.

The condensation of the amines with formaldehyde to form the methylene diamines takes place satisfactorily at a mildly elevated temperature of about 160° F. Higher or lower temperatures may be used. The mol ratio of amines to formaldehyde for this reaction is 2:1. When the condensation reaction is completed and all of the formaldehyde has combined, the temperature is raised to a temperature of from about 260° F. to about 400° F. to dehydrate the product.

As has been stated, the amidic acids, or phthalamic acids, employed in accordance with our invention are prepared by reacting phthalic anhydride (the cyclic anhydride of o-phthalic acid) with the above described methylene diamines. This reaction generally takes place quite satisfactorily at about 200° F. The reaction is normally complete in from about 60 to about 120 minutes. It is preferred to conduct the reaction in a solvent medium, advantageously a mineral oil such as light naphtha or the like. However, this expedient is not essential. In preparing the calcium salt of the amidic acid, it is not necessary to prepare the amidic acid first separately, but the methylene diamine, phthalic anhydride, and calcium hydroxide can all be reacted together simultaneously. Thus, the calcium hydroxide can be added directly to the reacting mass in the form of an aqueous slurry. Alternatively, the calcium salt may be prepared by metathesis. In such instances the alkali metal salt is first formed by neutralization of the phthalamic acid, and subsequently reacted with a water-soluble salt of calcium, e. g. calcium chloride.

The following example is illustrative of a method of preparing the class of compounds disclosed herein. It is understood that variations in proportions of ingredients, times of reaction, order of steps, and temperatures may be resorted to when desirable:

EXAMPLE

Four mols of cocoamine were introduced into a reaction vessel. Two mols of formaldehyde (in a 37 per cent by weight aqueous solution) were slowly added with constant stirring while maintaining the temperature below about 160° F. When the reaction was completed, after about 60 minutes, the temperature was raised to 350° F. to remove all water, including that added with the formaldehyde and that formed in the reaction. The methylene diamine product so formed and one mol of calcium hydroxide were then dispersed in an equal weight of a light mineral oil. Two mols of phthalic anhydride (the anhydride of o-phthalic acid) were then added and the temperature held at 200° F. for two hours. The temperature was subsequently raised to 270° F. to dry the product, and thereafter the product was filtered. The mineral oil solution of the calcium phthalamidate formed by this process had the following properties:

| | |
|---|---|
| Sp. gr., 60°/60° F | 0.8969 |
| Viscosity, SUV 100° F | 279 |
| Color, NPA | 1.75 |
| Neutralization No. | 1.74 |
| Ash: percent | 1.6 |
| pH value | 9.9 |

The product obtained in accordance with Example I is a concentrate of the additive of our invention in a mineral oil solution which may readily be diluted down to the desired concentration with mineral naphtha base insecticide solvents or other solvents. A deodorized naphtha which is advantageously used as a solvent for our insecticidal compositions, had the following properties:

| | |
|---|---|
| Gravity, ° API | 50.4 |
| Flash, TCC: ° F | 154 |
| Cloud, ° F | −30 |
| Color, Saybolt | +30 |
| Appearance | Clear |
| Doctor | Good |
| Odor | V. s. pet. |
| Sulfur, L, percent | 0.03 |
| Flock test method 130.1, Gov't | OK |
| Copper strip test, 122° F., 3 hr | Passes |
| Neutralization No | Nil |
| Acid heat, ° F | 1 |
| Iodine No., mod. Hanus | 0.5 |
| Aniline point, ° F | 170.6 |
| Distillation, naphtha, ASTM D 86–46: | |
| Over point, ° F | 376 |
| End point, ° F | 493 |
| 10% at, ° F | 395 |
| 20 | 401 |
| 30 | 408 |
| 40 | 415 |
| 50 | 422 |
| 60 | 430 |
| 70 | 441 |
| 80 | 453 |
| 90 | 470 |
| Recovery, percent | 98 |
| Residue percent | 1 |
| Loss, percent | 1 |

Other hydrocarbon solvents which may advantageously be used in accordance with the present invention, both in preparing the concentrate of Example I and as a solvent for insecticidal compositions, include lubricating oils of light viscosity, aromatic hydrocarbons, such as benzene and toluene, alkyl naphthalenes, such as alpha-methyl naphthalene, acetone and alcohol.

The salt formed in the example had the following formula:

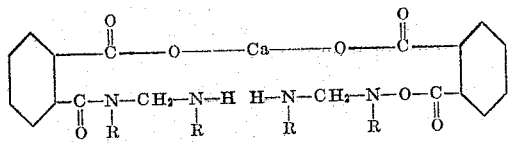

wherein "R" represents the "coco" radical or residue of the cocoamine.

The salt formed as described above for the use of a volatile solvent instead of a lubricating oil solvent, exhibited the following characteristics after removal of solvent:

| | |
|---|---|
| Characteristics | Clear solid |
| Molecular weight | 1200 |
| Ash: percent by wt | 4.66 |

The salt described in the foregoing example was also prepared by metathesis.

Relatively small quantities of the product prepared in accordance with the example, for example, as little as about 100 mg./100 cc. solvent, or about 0.1 per cent by weight of the composition, were found to exert a pronounced synergistic effect upon a pyrethrin extract of pyrethrum flowers in a petroleum naphta. The rate at which the killing effect of the pyrethrins-calcium phthalamidate composition is improved increases rapidly with addition of the additive in amounts up to about 2000 mg./100 cc. solvent, or about 2.5% by weight of the composition. Still further improvement in final kill is obtained addition of the calcium phthalamidate in amounts of up to about 15,000 mg./100 cc. solvent, or about 20% by weight. However, the rate of improvement is less above about 2.5% calcium phthalamidate. Preferred proportions of the additive are from about 0.1% to about 5.0% by weight of the composition or between about 100 and about 4000 mg./100 cc. solvent. The most useful proportions of pyrethrins are between about 0.02% and about 2.5% by weight of the composition, or from about 20 to about 2000 mg./100 cc. solvent.

The synergistic effect of the calcium phthalamidate additives of this invention may be clearly shown according to a method similar to that outlined in the paper entitled "The Evidence Required to Show Synergistic Action of Insecticides and a Short Cut in Analysis," by F. M. Wadley, published by the U. S. Department of Agriculture, Agricultural Research Administration, Bureau of Entomology and Plant Quarantine, June 1945.

According to this method, if the actual effect of a combination of poisons having a similar joint effect can be shown to exceed significantly the action expected from similar joint effect, the presence of synergism may reasonably be concluded. "Similar joint effect" is produced by two or more poisons acting similarly, and affecting the same organs or processes in the individual. The greatest effect of a mixture of poisons predictable from the action of the individual poisons is similar joint effect. Accordingly, the predicted similar joint effect of the mixture of poisons is the value which must be exceeded in order to show synergism.

Briefly, the method referred to involves plotting the per cent kill against concentration on log-probability paper for a first poison. Log-probability paper is employed in order to provide a linear curve. Then, knowing the concentration of a second poison required to produce a per cent kill plotted on the curve mentioned above, one can read from the plotted curve the concentration of the first poison required to produce the same per cent kill. An equivalence can be then set up so as to express mixtures of the first and second poison in terms of the one plotted. Thus, if the effectiveness of poison A is plotted as indicated above, and if it is determined that poison B requires 2 units to produce a 50% kill, and from the curve plotted for poison A it is determined that a 50% kill is produced by 1 unit of poison A, then it may be predicted, for example, that a mixture of 0.5 unit A and 1.0 unit B should produce a 50% kill. The predicted kill is then compared with the actual kill to determine the presence of synergism.

In the present instance, the attached figure of drawing is a log-probability plot of per cent kill (flies) against concentration of pyrethrins in g./100 cc. The following data was that used in plotting the curve.

*Pyrethrins*

| Concentration, g./100 cc. petroleum naphtha | Percent Kill, Gulf Method 223 |
|---|---|
| 0.05 | 22 |
| 0.10 | 48 |
| 0.15 | 63 |
| 0.20 | 73 |

These points lie along a straight line as indicated in the attached drawing.

It was determined by experimentation that 15.0 g./100 cc. petroleum naphtha of the calcium phthalamidate of the example were required to produce a 45% kill (flies). From the attached figure it may be seen that slightly less than 0.1 g./100 cc. of pyrethrins is required to produce a 45% kill. Therefore, one unit of the calcum phthalamidate is equivalent to approximately 0.0067 unit pyrethrins. The predicted kill of $x$ units calcium phthalamidate and $y$ units of pyrethrins should be equal to the per cent kill (as read from the pyrethrin curve) of $(y+0.0067x)$ units pyrethrins. This value is then compared with the actual kill as determined experimentally for the mixture of the calcium phthalamidate and pyrethrins.

The following table sets forth the interpolated or predicted kill and actual kill for various compositions of the calcium phthalamidate of the example and pyrethrin extract in a solution of petroleum naphtha.

TABLE

| Pyrethrin Concentration, g./100 cc. | Calcium Phthalamidate Concentration, g./100 cc. | Pyrethrin Equivalent, g./100 cc. | Kill percent (flies) | |
|---|---|---|---|---|
| | | | Interpolated [1] | Actual (Gulf Method 223) |
| 0.05 | 1.0 | 0.057 | 27 | 48 |
| 0.10 | 0.1 | 0.101 | 48 | 62 |
| 0.10 | 1.0 | 0.107 | 50 | 83 |
| 0.10 | 2.0 | 0.113 | 52 | 94 |
| 0.10 | 15.0 | 0.200 | 74 | 97 |
| 0.15 | 1.0 | 0.157 | 65 | 98 |

[1] See attached figure of drawing.

From the data of the table it is evident that in each instance the actual per cent kill exceeded significantly the predicted kill. Synergism is therefore clearly shown.

The fly killing test method 223, Gulf, is set forth in detail in U. S. Patent No. 2,421,223.

Compositions prepared in accordance with our invention are useful in combating a variety of insect pests, such as, flies, moths, aphids, ants, roaches, and the like.

The above disclosure and specific examples are intended to be only illustrative of the invention, and it is understood that resort may be had to such modifications and equivalents as fall within the spirit of the invention and the scope of the appended claims.

What we claim is:

1. An insecticidal composition comprising a pyrethrin insecticide toxicant, a solvent therefor, and a substantially neutral calcium salt of a phthalamic acid having the following formula:

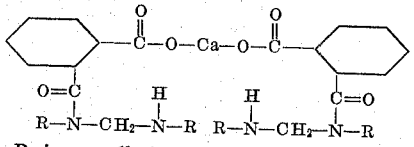

wherein R is an alkyl group containing from 8 to 20 carbon atoms, said calcium salt being present in the amount of from about 100 to about 15,000 mg./100 cc. solution.

2. An insecticidal composition comprising a pyrethrin insecticide toxicant, a hydrocarbon solvent therefor, and a substantially neutral calcium salt of a phthalamic acid having the following formula:

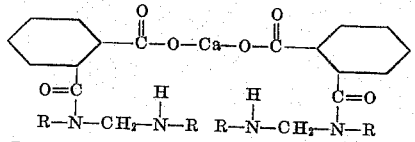

wherein R is lauryl, said calcium salt being present in the amount of from about 100 to about 15,000 mg./100 cc. solution.

3. The composition of claim 2 wherein the said calcium salt is present in the amount of from about 100 to about 4000 mg./100 cc. solution.

References Cited in the file of this patent

UNITED STATES PATENTS

| 2,554,249 | Hill et al. | May 22, 1951 |
| 2,554,274 | Smith et al. | May 22, 1951 |

OTHER REFERENCES

Frear: Chem. of Insecticides, Fungicides, and Herbicides, 2nd ed., D. Van Nostrand, Inc. (1948), pp. 153 to 156.